United States Patent [19]

Long

[11] Patent Number: 5,220,883
[45] Date of Patent: * Jun. 22, 1993

[54] PREFABRICATED DOGHOUSE

[76] Inventor: Ruth I. Long, 10500 Dean St., #42, Bonita Springs, Fla. 33923

[*] Notice: The portion of the term of this patent subsequent to May 26, 2009 has been disclaimed.

[21] Appl. No.: 878,300

[22] Filed: May 6, 1992

Related U.S. Application Data

[63] Continuation-in-part of Ser. No. 592,836, Oct. 4, 1990, Pat. No. 5,115,762.

[51] Int. Cl.$^5$ ............................................. A01K 1/02
[52] U.S. Cl. ..................................................... 119/19
[58] Field of Search ................... 119/15, 19, 17, 20; 217/14, 46; 190/21, 107; 52/69, 70, 71

[56] References Cited

U.S. PATENT DOCUMENTS

| 785,794 | 3/1905 | Buckingham | 119/9 |
| 1,056,491 | 3/1913 | Biddinger | 217/14 |
| 1,973,029 | 9/1934 | Walston | 119/19 |
| 2,534,492 | 12/1950 | Williams | 119/19 |
| 3,048,147 | 8/1962 | McKean | 119/19 |
| 4,793,507 | 12/1988 | Delplanque | 217/14 X |

Primary Examiner—Gene Mancene
Assistant Examiner—Thomas Price
Attorney, Agent, or Firm—William F. Hamrock

[57] ABSTRACT

A prefabricated shed style or barn style doghouse animal structure having a plurality of separate prefabricated sections which can be quickly assembled and dismantled. The separate prefabricated sections when assembled are rigidly secured in place internally by interlocking components forming a solid unit structure with a way for restricting outward rotation of adjacent sections.

18 Claims, 7 Drawing Sheets

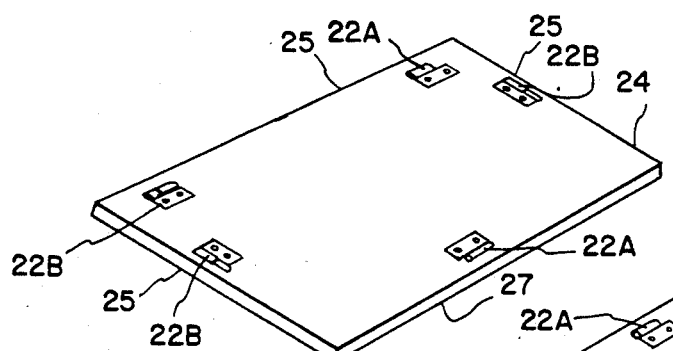
FIG. 3A
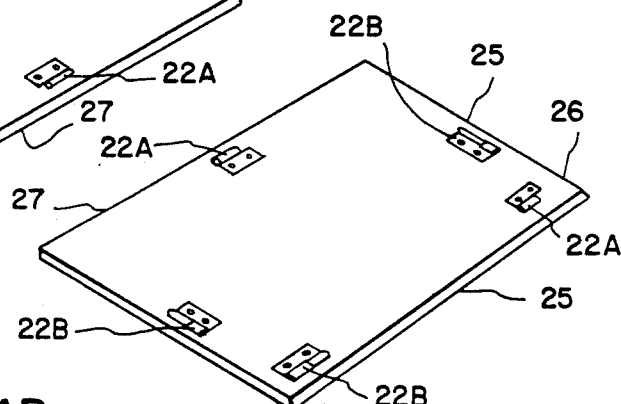
FIG. 3B
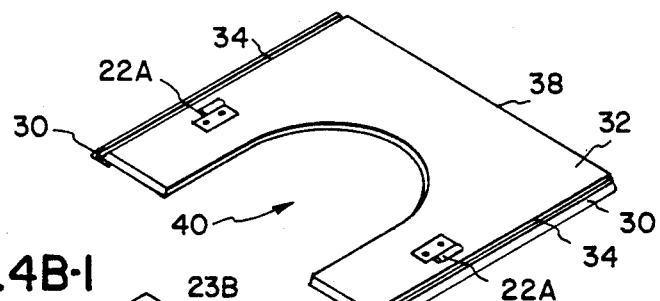
FIG. 4B
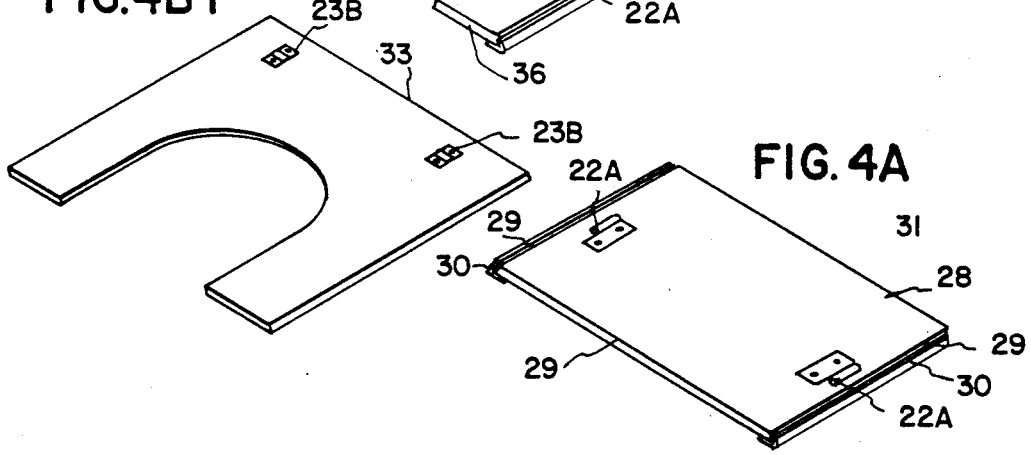
FIG. 4B-1
FIG. 4A FIG. 5B-1
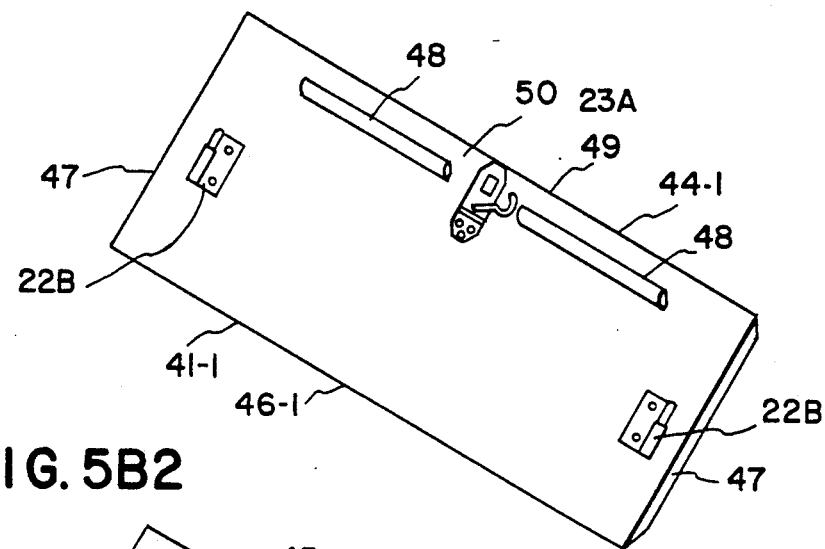
FIG. 5B2
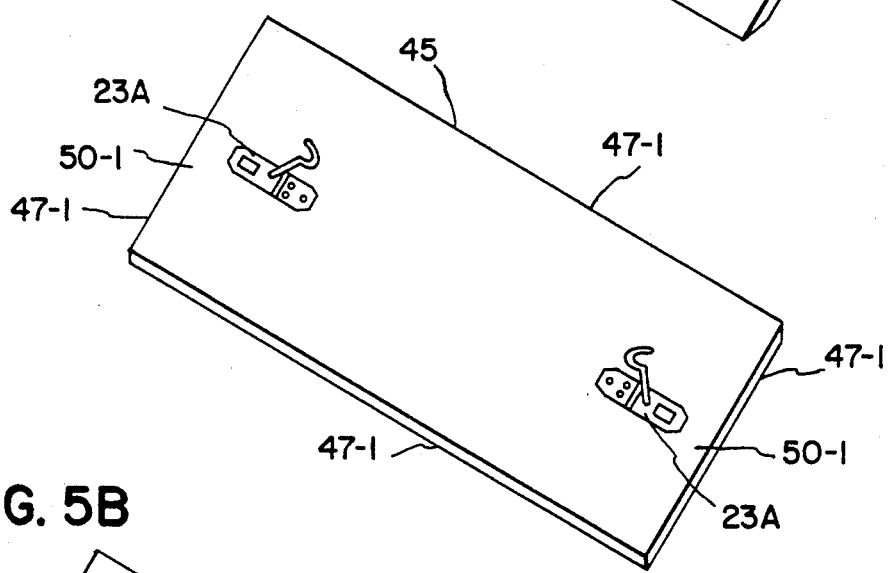
FIG. 5B
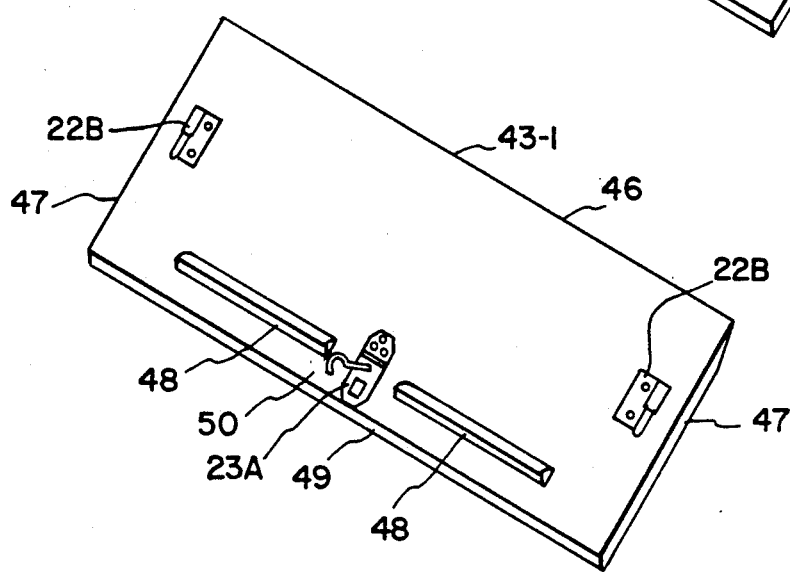

FIG. 6B
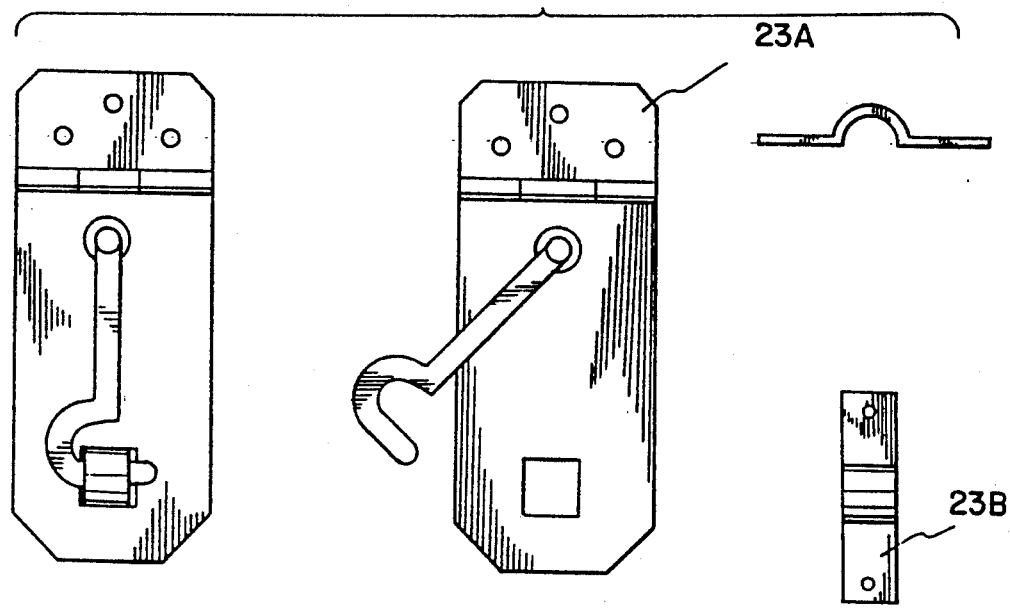
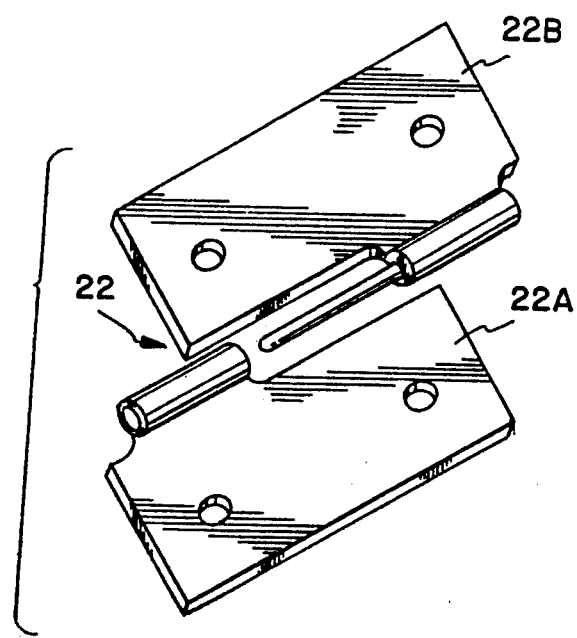
FIG. 6A

PREFABRICATED DOGHOUSE

This application is a continuation-in-part of U.S. patent application Ser. No. 07/592,836 for Gable Style Prefabricated Doghouse, filed Oct. 4, 1990, now U.S. Pat. No. 5,115,762.

BACKGROUND OF THE INVENTION

1. Field of the Invention

The invention relates to a doghouse or similar animal structure and, in particular, to a durable shed or barn style prefabricated doghouse which can be easily assembled and dismantled.

2. Description of the Prior Art

There is a problem in the prior art in obtaining prefabricated dog houses or similar animal structures which are durable, attractive, leak proof, easy to assemble and to dismantle and easy to store and to transport.

Prior U.S. patents relate to various types of animal shelters. However, many of these suffer from the disadvantages of being difficult to assemble structures that are fragile having poor durability, are difficult to dismantle and form bulky packages which are difficult to store or transport.

SUMMARY OF THE INVENTION

The present invention and the gable style prefabricated dog house of U.S. patent application Ser. No. 07/592,836 solve many of the problems and shortcomings of the prior art by providing an attractive durable dog house which can be easily assembled or dismantled from only six prefabrication sections for the shed style dog house and only eight prefabricated sections for the barn style dog house. Both the shed and barn style dog houses have a floor, two opposite side walls and two opposite end walls. The shed style dog house has one roof section and the barn style dog house has three roof sections. These prefabricated sections are easily assembled by simply sliding them together and interlocking with durable metal hinges to help make one solid complete unit.

When assembled, separable durable hinges and hasp fasteners have been placed so that all the sections are so interlocked as to make each dog house a solid unit. It can be picked up in any manner without any danger of it coming apart. It does not give the appearance of being able to be taken apart which is one of many unexpected features.

The floor is reinforced, by having a center board across the underside, and is held up off the ground by support blocks which allows air circulation and prevents interior dampness. The blocks are placed so as to give a sturdy foundation to the structure, and can be secured by screws or similar attachment so that they can be removed for transporting and easier compact packaging.

The unit is leakproof because the seams of the exposed areas are covered with molding for a tight seal.

It is an object of the present invention to provide a shed or barn style prefabricated dog house which is attractive, durable, leakproof, has good ventilation and does not give the appearance of having been prefabricated.

It is another object of the present invention to provide such a prefabricated dog house which can be easily assembled and dismantled.

It is a further object of the present invention to provide such an unassembled or dismantled dog house with compactly stacked prefabricated sections which are easy to store and to transport.

It is another further object to provide such a dog house made of prefabricated sections that are simply constructed and easy to manufacture.

The above objects are met with the present shed or barn style prefabricated dog house.

BRIEF DESCRIPTION OF THE DRAWINGS

FIGS. 3A and 3B are views of the right and left side wall interiors respectively of the shed style dog house.

FIG. 4A is a view of the end wall section interior and FIGS. 4B and 4B-1 are views of the front wall interior and front wall exterior respectively of the shed style dog house.

FIG. 5A is a view of the roof interior of the shed style dog house and FIGS. 5B, 5B-1 and 5B-2 are views of the right, left and center roof sections interiors respectively of the barn style dog house.

FIGS. 6A and 6B are views of hinges that can be used in the construction of the dog house.

DETAILED DESCRIPTION OF THE INVENTION

Figure 1A:
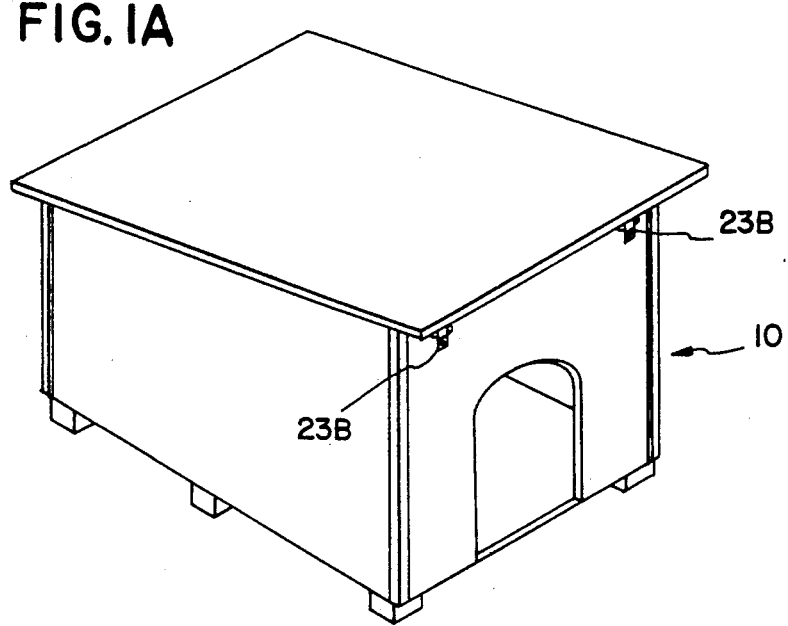
FIGS. 1A and 1B are views of the shed and barn style dog houses respectively of the invention.
Figure 1B:
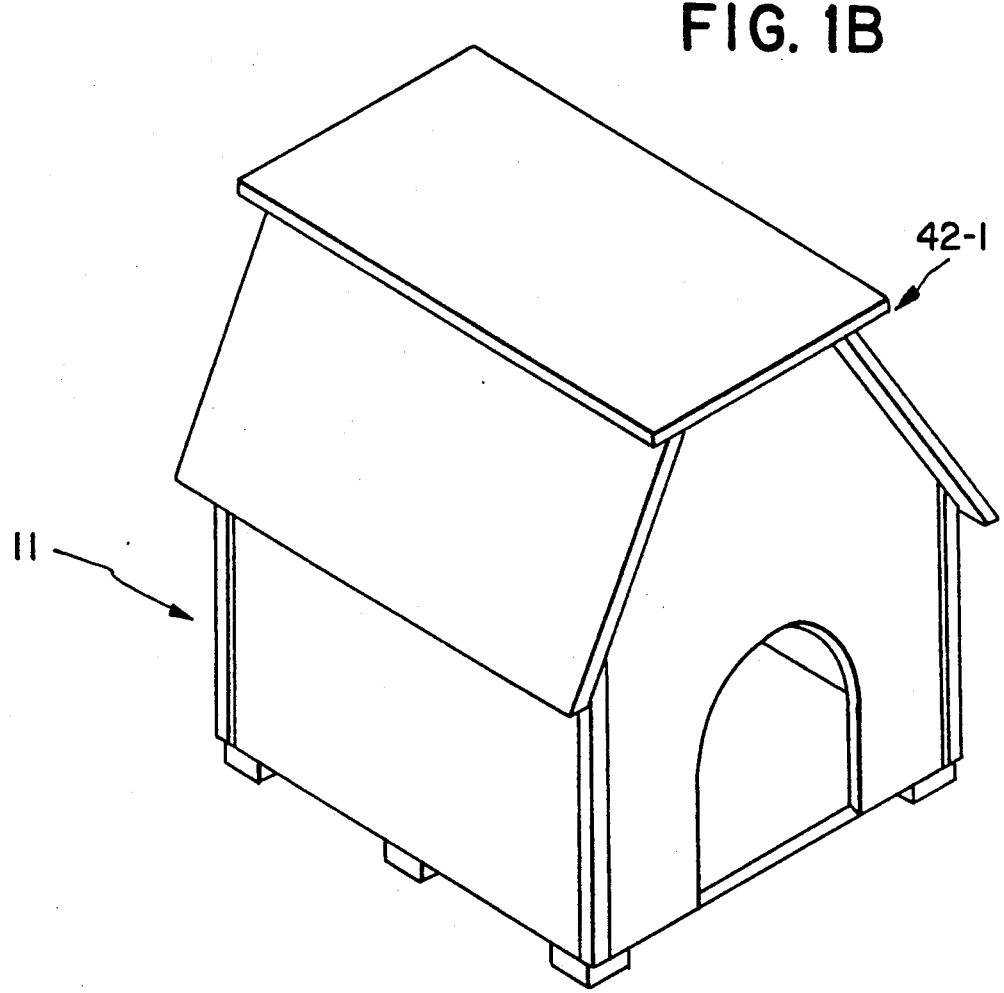

Referring more specifically to the drawings, the prefabricated shed style dog house 10 and the barn style dog house 11 are shown in FIGS. 1A and 1B. The shed style is composed of six prefabricated sections: a floor, two side walls, two end walls and one roof section as shown in FIGS. 1A, 2A and 2B, 3A, 3B, 4A, 4B and 4B-1 and 5A respectively. The barn style doghouse is composed of eight prefabricated sections; a floor, two side walls, two end walls and three roof sections as shown in FIGS. 1B, 2A and 2B, 3C and 3D, 4C, 4D, 5B, 5B-1 and 5B-2 respectively.

The doghouses are preferably formed from ½ inch indoor-out-door plywood or equivalent material with durable male-female hinges securing the sections together. The hinges can be made of metal such as brass or equivalent durable material. An example of the structure of the two preferred hinges is shown in FIGS. 6A and 6B. Male slip pin fastener 22B securely interlocks with female slip pin fastener 22A as seen in FIG. 6A. FIG. 6B shows the hasp fastener and hook lock mechanism 23A and 23B. The hinge fasteners are fastened to the structure with screws, nails or equivalent fastening devices.

The male and female slip pin fasteners and hasp fasteners with hook locks produce a tight rigid structure which is easily assembled and dismantled and the sections can be compactly stacked for storage or transporting.

Figure 2B:
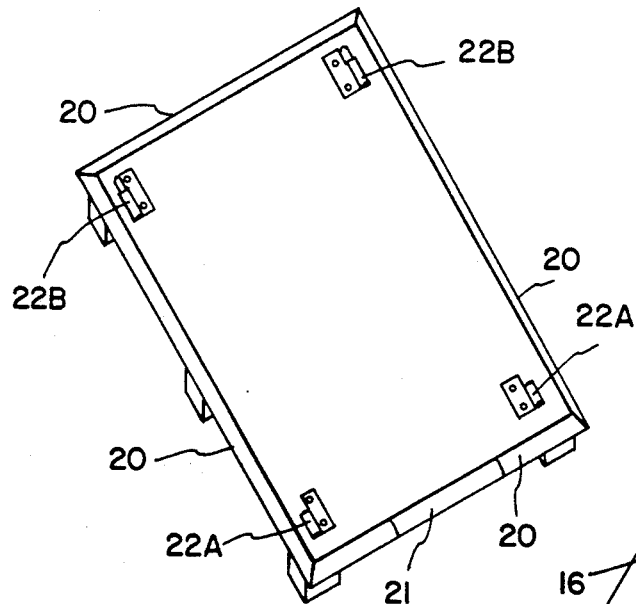
FIGS. 2A and 2B include a bottom view of the underside of the floor section and a top view of the floor section respectively of both dog houses.
Figure 2A:
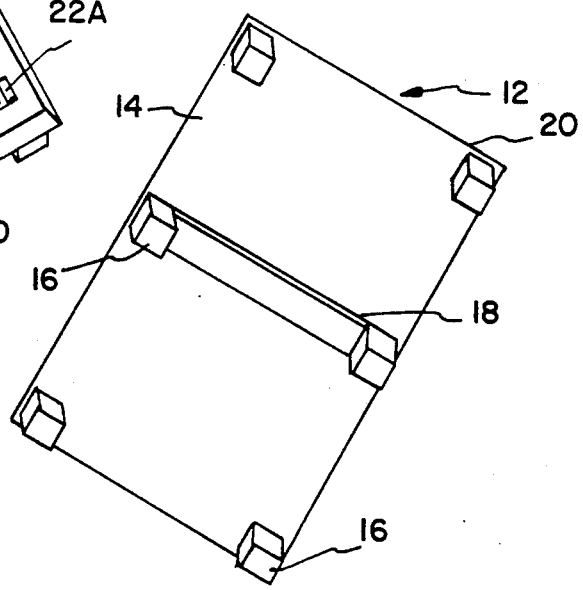

The floor configuration 12 is the same for the shed and barn style doghouses and is depicted in FIGS. 2A and 2B. As shown, the floor underside has six blocks 16 made of wood or equivalent material, wherein one block is attached at each of the 4 corners of the floor panel 14 and one block is attached at each end of centerboard 18 attached to the underside of the floor panel. Centerboard 18 is attached to the underside center of floor panel 14 for added reinforcement of the floor. Blocks 16 are located inwardly about one inch from the outer edge of the floor panel. The blocks support the structure above the ground and allow free air circulation, decreasing interior dampness and give a sturdy foundation. The blocks can be secured to the underside of the floor panel by screws or equivalent securing mechanism so that they can be removed if desired for easier packaging or storage.

The floor interior, seen in FIG. 2B, is provided with four half slip pin fasteners of metal hinges 22. One each of male (22B) and female (22A) half slip pin fasteners are located on opposite sides of floor panel 14 as shown. The four side edges 20 of the floor panel 14 have corresponding inwardly bevelled edges cut at an angle of about 45 degrees for added tightness and secured fitting of the structure. For added protection to keep the floor from absorbing dampness, molding 21 can be provided over the bevelled edge of the floor at the door opening.

FIGS. 3A and 3B illustrate the shed style structure of the interiors of right side wall 24 and of left side wall 26. Attached to the bottom interior of each end of the side wall sections are two half slip pin fasteners, one each of male (22B) and female (22A) of metal hinge 22, which will slideably engage half fasteners of their mates on floor panel 14 when assembled thereto. The upper interior sides of the side walls are provided with a half slip pin fastener 22B per side thereof. The upper interior top side of the side walls are provided with a slip pin fastener 22A.

Each of the shed style side walls 24 and 26 except for the top edge has bevelled edges. The sides and bottom edges 25 bevel inwardly about 45 degrees while the top edges 27 are cut flat at about 90 degrees square. The top edges 27 slant in a sloping rearward direction as the height of the side walls 24 and 26 decreases as shown in FIGS. 3A and 3B. Each side wall is mounted in an upright position on the floor by joining the flooring and side walls at the bevelled edges and securing in place with half slip pin fasteners 22B of the side walls into slip pin fasteners 22A of the back end wall. Because the bevelled edges in the joined sections are secured internally, the rigidity and tightness of the structure is significantly increased.

As seen in FIG. 4A, the back end wall 28 interior of the shed style includes side and bottom edges 29 bevelled inwardly at an angle of about 45 degrees while the top edge 31 is cut flat at about 90 degrees square. A right angle shaped corner bead molding 30 about ½ inch by ½ inch is attached to the outside edge of each side by adhesive and/or staple or equivalent securing elements with about a ½ inch corner bead side molding overlapping the back end wall as shown. The interior side areas are provided with half slip pin fastener 22A.

Back end wall 28 is attached to the shed style structure by sliding it onto back end edges 25 of side walls 24 and 26 and back end edge 20 of the floor panel. The bevelled side wall edges and floor panel edges are tightly fitted to the bevelled side edges and bottom edges 29 of the back end wall and within corner bead moldings 30. The back end wall is secured in place by locking half slip pin fasteners 22A onto half slip pin fasteners 22B of the side walls.

FIG. 4B depicts the shed style front end wall 32 interior which is higher than the back end wall to allow for a sloping flat roof. It is similar to the back end wall in that side edges 34 and bottom edges 36 are bevelled inwardly at an angle 45 degrees and top edges 38 are cut flat at about 90 degrees square; right angle shaped bead molding 30 is attached to the outside edge of each side; and the interior side areas are provided with slip pin fasteners 22A. An entrance opening 40 is cut in the center of the front wall.

FIG. 4B-1 depicts the shed style front end exterior 33 with two hasp fasteners 23B positioned below the top edge as shown. The shed style front end wall 32 is attached and secured to the structure in a similar manner as that of back end wall 28. Front end wall 32 is fitted tightly into the front ends of side walls 24 and 26 and floor panel 14 and within corner bead moldings 30, and is secured in place by mating and locking male half slip pin fasteners 22B within female half slip pin fasteners 22A of the front wall interior.

Figure 5A:
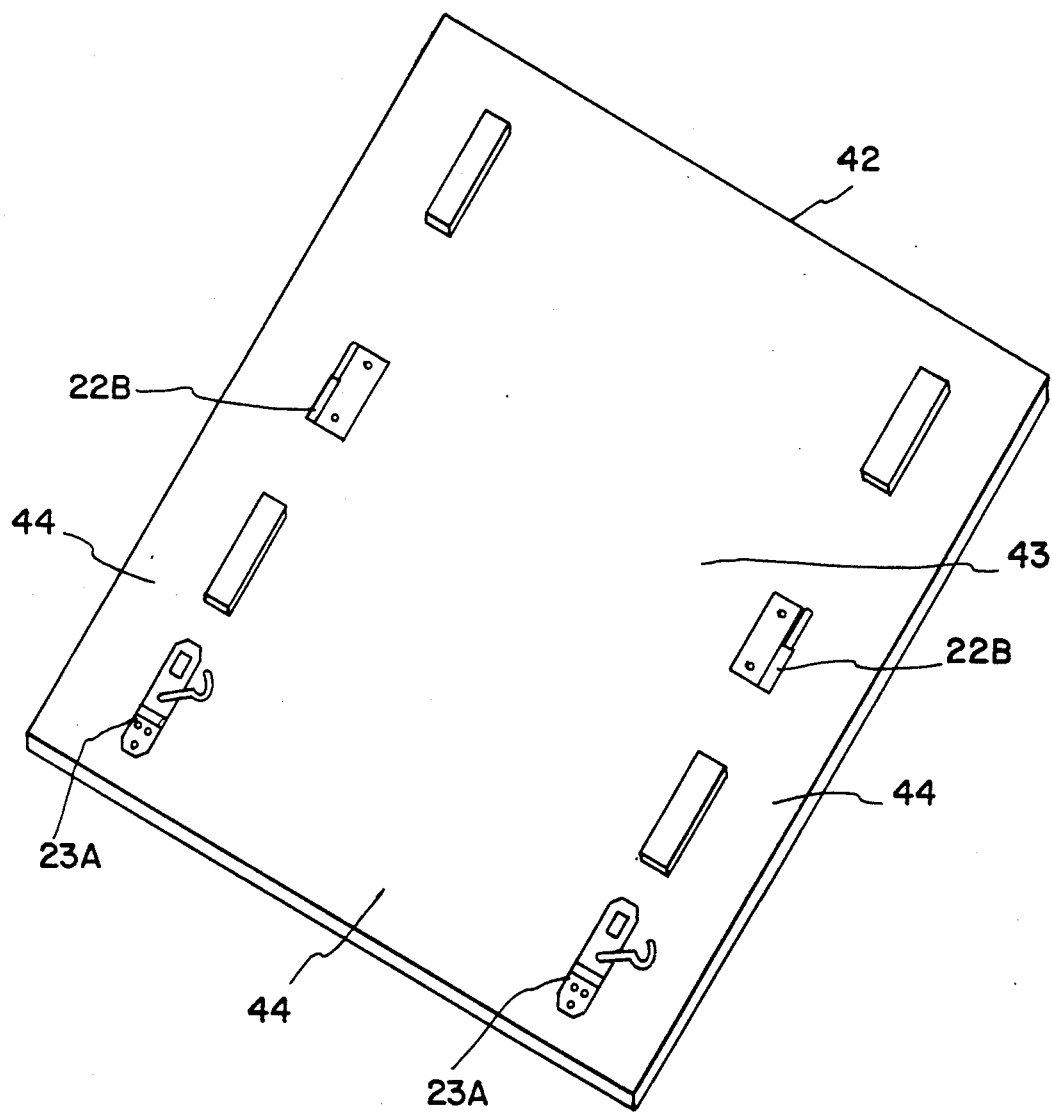

FIG. 5A depicts the underside of the shed style flat roof 42 showing the interior section 43 and the front, back and side overhang sections 44. Two half fasteners 22B are positioned in the interior section 43 just at the edge of the side overhangs 44 as shown. Two hasp fasteners 23A are positioned on the front overhang section 44 just outside the front edge of interior section 43.

Shed roof panel 42 is attached by placing it onto the top of the structure, resting its bottom interior surfaces on the top edges of the side walls and on the top edges of the front and back end walls. Roof panel 42 is secured in place internally by mating and locking half slip pin fasteners 22B positioned on the edges of the roof interior section 43 to half slip pin fasteners 22A positioned on the upper interior of the side walls. The hooks of the two hasp fasteners 23A are fastened through the hook locks of hasp fasteners 23B positioned on the upper exterior of the front end wall.

Figure 3C:
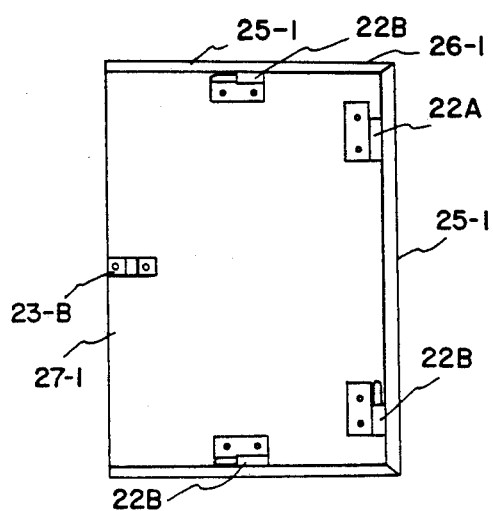
FIGS. 3C and 3D are views of the left and right side wall sections interiors respectively of the barn style dog house.
Figure 3D:
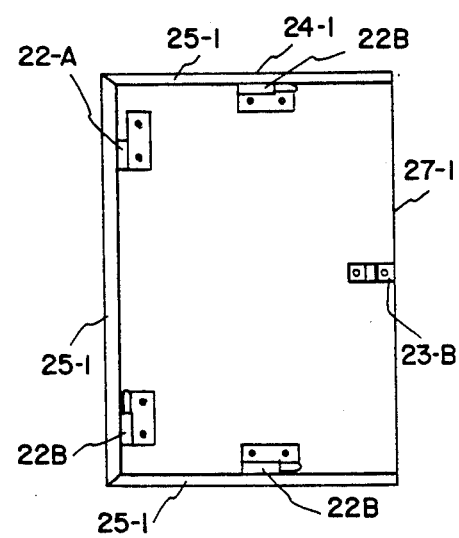

FIGS. 3C and 3D illustrate the barn style structure of the interiors of right side wall 24-1 and of left side wall 26-1. Attached to the bottom interior of each end of the side wall sections are two half slip pin fasteners, one each of male (22B) and female (22A) of metal hinge 22, which will slideably engage half fasteners of their mates on floor panel 14 when assembled thereto. The structure of the upper middle interior of each side wall has one each of hasp fastener 23B. The interior sides of the side walls are provided with a half fastener 22B per side thereof.

Each of the barn style side walls 24-1 and 26-1 except for the top edge has bevelled edges. The sides and bottom edges 25-1 bevel inwardly about 45 degrees while the top edges 27-1 are cut flat at about 90 degrees square. Each side wall is mounted in an upright position on the floor by joining the flooring and sides at the bevelled edges and securing in place with halfslip pins 22B into half fasteners 22A. Because the bevelled edges in the joined sections are secured internally, the rigidity and tightness of the structure is significantly increased.

Figure 4C:
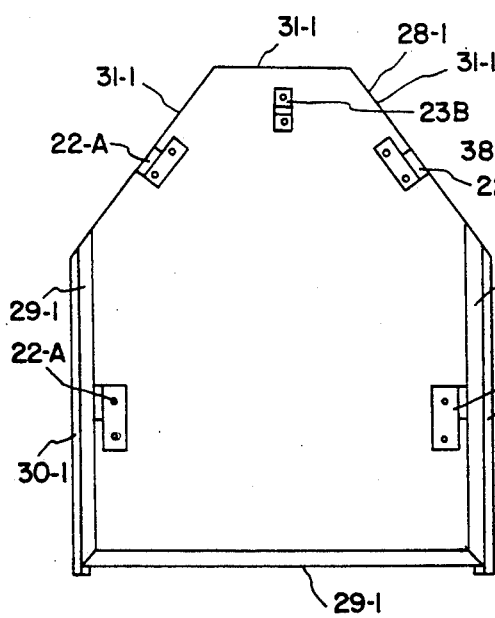
FIG. 4C is a view of the end wall interior.

As seen in FIG. 4C, the back end wall 28-1 interior of the barn style includes side and bottom edges 29-1 bevelled inwardly at an angle of about 45 degrees while the top edge 31-1 is cut at about 90 degrees square. A right angle shaped corner bead molding 30-1 is attached to the outside edge of each side by adhesive and/or staple or equivalent securing elements with about ½ inch corner bead side molding overlapping the rear wall as shown. The interior side areas are provided with half slip pin 22A. On each barn style side top edge is located a half slip pin 22A and one 23B is provided at top center below the top edge as shown.

Back end wall 28-1 is attached to the barn style structure by sliding it onto back end edges 25-1 of side walls 24-1 and 26-1 and back end edge 20 of the floor panel. The bevelled side wall edges and floor panel edges are tightly fitted to bevelled side edges and bottom edges 29-1 of the back end wall and within corner bead moldings 30-1. The back end wall is secured in place by locking its half slip pins 22A onto half slip pin fasteners 22B of the side walls.

Figure 4D:
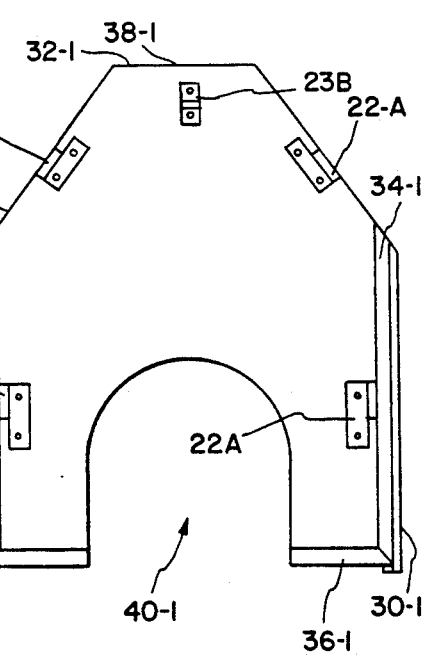
FIG. 4D is a view of the front wall interior of the barn style dog house.

FIG. 4D depicts the barn style front end wall 32-1 interior. It is similar to the back end wall in that side edges 34-1 and bottom edges 36-1 are bevelled inwardly at an angle 45 degrees and top edges 38-1 are cut flat at about 90 degrees square; right angle shaped bead molding 30-1 is attached to the outside edge of each side; and the interior side and top side areas are provided with slip pins 22A and a 23B is provided below the barn style top edge as shown. An entrance opening 40-1 is cut in the front center wall.

Front end wall 32-1 is attached and secured to the structure in a similar manner as that of back end wall 28-1. Front end wall 32-1 is fitted tightly into the front ends of side walls 24-1 and 26-1 and floor panel 14 and within corner bead moldings 30-1, and is secured in place by mating and locking male half slip pins 22B with female half fasteners 22A.

FIGS. 5B, 5B-1 5B-2 show the interior of the barn style roof structure 42-1 of FIG. 1B. FIGS. 5B and 5B-1 show the right and left roof panel interiors 43-1 and 44-1 wherein the top edges 46 are bevelled out at about an angle that assures a proper fit of the top roof edges to interior of center roof panel 45. Edges 47 and bottom drip edges 49 can be cut flat at about 90 degrees square. Two slip pin fasteners 22B are positioned below the top edges 46.1 as shown. Two molding strips 48 are secured within the roof panels interiors at the boundary of the overhang 50. FIG. 5B2 shows the center roof panel 45 interior wherein the edges 47-1 can be cut flat at about 90 degrees square. Two hasp fasteners 23A are positioned within the inside of the front and back edges of overhang 50-1 where they attach to the opposed hasp fasteners 23B positioned in the middle interior top edges of front and back wall panels 32-1 and 28-1 shown in FIGS. 4D and 4C.

The barn style right roof panel 43-1 shown in FIG. 5B is attached to the right side of the structure by placing its moldings strips 48 on the top of the right side wall and resting the side overhang on the top edges of the front and back end walls. The hasp fastener 23A located in between the molding strips 48 of roof panel 43-1 and 44-1 fastens with 23B located in the upper middle interior of each side wall.

FIG. 5B-1 shows the barn style left roof panel 44-1 to be similar to right roof panel 43-1 by having the same type structure. Thus left roof panel 44-1 is attached to the left side of the structure in the same manner. It is set in place on the left side of the structure by placing its molding strips 48 on the left side wall and resting the sides overhang on the top edges of the front and back end walls in the same manner as the right roof panel 43-1 is attached.

The structures are now assembled as shown in FIGS. 1A and 1B. They can be easily dismantled by reversing the above assembling procedures.

Each of dismantled structures forms a compact package when the sections are stacked together. A preferred method of stacking the sections for each style is as follows:

| | SHED STYLE DOG HOUSE |
|---|---|
| Bottom (1) | Roof section - Interior facing up, |
| (2) | Floor section - Interior facing up, |
| (3) | Left side wall section - Interior facing up, |
| (4) | Right side wall section - Interior facing up, |
| (5) | Front end wall section - Interior facing up, |
| Top (6) | Back end wall section - Interior facing down. |

| | BARN STYLE DOGHOUSE |
|---|---|
| Bottom (1) | Floor section - Interior facing up, |
| (2) | Left side wall section - Interior facing up, |
| (3) | Back end wall section - Exterior facing up, |
| (4) | Right side wall section - Exterior facing up, |
| (5) | Left and right roof panel sections - Lying flat side-by-side with left roof panel Interior facing up and right roof panel Interior facing down, |
| (6) | Middle roof panel section - Lying Interior facing upon middle seam of joined roof panels, |
| Top (7) | Front end wall section - Interior facing up. |

The stacked sections can be completely packaged for storage or transport.

Further, it will be apparent to those skilled in the art from the foregoing description and accompanying drawings that additional modification and/or changes of the disclosed embodiments may be made without departure from the invention. Accordingly, it is expressly intended that the foregoing description and accompanying drawings are illustrative of preferred embodiments only, not limiting, and that the true spirit and scope of the present invention be determined by the reference to the appended claim.

I claim:

1. A prefabricated shed style or barn style animal structure comprising a plurality of separate prefabricated sections which can be quickly assembled and dismantled, each section having an internal and external surface, each internal surface having interlocking means positioned to releasably engage adjacently connected sections, said interlocking means including releasably engageable male and female interlocking means, the assembled structure comprising a bottom floor section mounted on removable support means, two opposed upstanding side wall sections releasably connected to said floor section by said interlocking means, two opposed upstanding front and end wall sections releasably connected by said interlocking means to said floor and said side wall sections, said front wall section having an opening for entrance and egress of an animal, at least one roof section connected to said side wall sections by said interlocking means, said separate sections when assembled are rigidly secured in place internally by said interlocking means forming a solid unit structure with means for restricting outward rotation of adjacent sections.

2. An animal structure according to claim 1 wherein the sections are formed from ½ inch indoor-outdoor plywood.

3. An animal structure according to claim 1 wherein said floor section is mounted on six blocks removably attached thereto.

4. An animal structure according to claim 1 wherein said connected wall sections are protected by moldings externally covering connected joined edges.

5. An animal structure according to claim 4 wherein said moldings are partially attached to connecting sections so as to overlap onto adjacent sections during assembly of the structure.

6. An animal structure according to claim 1 wherein the connected floor and wall sections have opposing bevelled edges.

7. An animal structure according to claim 1 wherein said interlocking means comprise a plurality of metal slip pin fasteners and hasp fasteners with hook locks.

8. An animal structure according to claim 7 wherein said slip pin fasteners are positioned internally on adjacent sections.

9. An animal structure according to claim 8 wherein said hasp fasteners with hook locks are positioned internally or externally on adjacent wall sections and roof sections.

10. An animal structure according to claim 9 wherein said connected sections of the floor section with the wall sections and of the side wall sections with the front and end wall sections, have opposing bevelled edges.

11. An animal structure according to claim 10 wherein the roof sections overlap said wall sections.

12. An animal structure according to claim 11 having a shed style roof.

13. An animal structure according to claim 12 wherein the shed style roof comprises one flat roof section.

14. An animal structure according to claim 11 having a barn style roof.

15. An animal structure according to claim 14 wherein the barn style roof comprises three roof sections.

16. An animal structure according to claim 1 wherein said structure can be quickly dismantled.

17. A dismantled structure according to claim 16 wherein said dismantled sections are stacked one on another to form a compact package.

18. An animal structure according to claim 1 wherein said front wall section includes a center entrance opening.

* * * * *